(12) United States Patent
Takagi

(10) Patent No.: US 10,411,761 B2
(45) Date of Patent: Sep. 10, 2019

(54) COMMUNICATION APPARATUS CAPABLE OF COMMUNICATING WITH EXTERNAL APPARATUS, CONTROL METHOD, AND RECORDING MEDIUM

(71) Applicant: CANON KABUSHIKI KAISHA, Tokyo (JP)

(72) Inventor: Toshiyuki Takagi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 10 days.

(21) Appl. No.: 15/814,077

(22) Filed: Nov. 15, 2017

(65) Prior Publication Data

US 2018/0145729 A1    May 24, 2018

(30) Foreign Application Priority Data

Nov. 21, 2016 (JP) ................. 2016-226269

(51) Int. Cl.
| | |
|---|---|
| *H04N 5/232* | (2006.01) |
| *H04B 5/00* | (2006.01) |
| *H04N 7/14* | (2006.01) |
| *H04W 84/12* | (2009.01) |
| *H04W 8/00* | (2009.01) |
| *H04W 4/70* | (2018.01) |

(Continued)

(52) U.S. Cl.
CPC ....... *H04B 5/0031* (2013.01); *H04N 5/23206* (2013.01); *H04N 7/148* (2013.01); *H04W 8/005* (2013.01); *H04W 84/12* (2013.01); *G06F 13/385* (2013.01); *H04M 2250/02* (2013.01); *H04W 4/70* (2018.02); *H04W 4/80* (2018.02)

(58) Field of Classification Search
CPC .......... H04N 5/23203; H04N 5/23206; H04N 5/232; H04N 2101/00; H04N 5/772
See application file for complete search history.

(56) References Cited

U.S. PATENT DOCUMENTS

| | | | |
|---|---|---|---|
| 2002/0140803 A1* | 10/2002 | Gutta ..................... | H04N 5/232 348/14.01 |
| 2007/0002157 A1* | 1/2007 | Shintani ............. | H04N 5/23216 348/333.06 |

(Continued)

FOREIGN PATENT DOCUMENTS

JP    2007-166511 A    6/2007

*Primary Examiner* — Abdelaaziz Tissire
(74) *Attorney, Agent, or Firm* — Canon U.S.A., Inc. IP Division

(57) ABSTRACT

A communication apparatus includes a communication unit that communicates with an image capturing apparatus, a Tele button, a Wide button, and a control unit that, in a case where an operation on the Tele button is received, controls the communication unit to transmit information for driving a lens of the image capturing apparatus toward a telephoto side to the image capturing apparatus, and that, in a case where an operation on the Wide button is received, controls the communication unit to transmit information for driving the lens of the image capturing apparatus toward a Wide side to the image capturing apparatus. In a case where both the Tele button and the Wide button are simultaneously operated, the control unit controls the communication unit to transmit data for performing pairing with the image capturing apparatus in response to receipt of data transmitted from the image capturing apparatus.

9 Claims, 8 Drawing Sheets

(51) Int. Cl.
G06F 13/38 (2006.01)
H04W 4/80 (2018.01)

(56) References Cited

U.S. PATENT DOCUMENTS

| | | | |
|---|---|---|---|
| 2009/0207270 A1* | 8/2009 | Gocho | H04N 1/44 348/222.1 |
| 2009/0213279 A1* | 8/2009 | Ichieda | H04N 9/3179 348/734 |
| 2012/0001844 A1* | 1/2012 | Auguste | G06F 1/1632 345/156 |
| 2016/0278151 A1* | 9/2016 | Kwon | H04W 76/14 |

* cited by examiner

COMMUNICATION APPARATUS CAPABLE OF COMMUNICATING WITH EXTERNAL APPARATUS, CONTROL METHOD, AND RECORDING MEDIUM

BACKGROUND

Field

The present disclosure relates to a communication apparatus that communicates with an external apparatus, a control method, and a recording medium.

Description of the Related Art

In recent years, a remote controller that operates a digital camera has been put into practical use. Such a remote controller is provided with a plurality of buttons for operating the digital camera. When a digital camera and a remote controller perform wireless communication with each other, different communication methods are used depending on communication distance. There are various communication methods, such as infrared communication, wireless LAN communication, Bluetooth® communication. Among these communication methods, the Bluetooth communication includes such features that the directivity of the Bluetooth communication is lower than that of the infrared communication and power consumption in the Bluetooth communication is lower than that in the wireless LAN communication.

In order to perform the Bluetooth communication, it is necessary to execute pairing processing to associate a digital camera with a remote controller. In order to execute the pairing processing, the remote controller is required to be provided with an operation member, e.g., a button or a key, for a user to Instruct the remote controller to execute paring. However, if the remote controller is provided with an operation member exclusively used for pairing, an issue such as an increase in the size of the remote controller arises.

Japanese Patent Laid-Open No. 2007-166511 is known as a technique for increasing the number of executable operations without increasing the number of buttons or keys. Japanese Patent Application Laid-Open No. 2007-166511 discusses a remote control device that transmits data corresponding to a direction, e.g., an upper right key, between two direction keys when a specific direction key, e.g., a right key, and another direction key, e.g., an upper key, which is adjacent to the specific direction key, are simultaneously operated. However, in Japanese Patent Application Laid-Open No. 2007-166511, pairing between the remote controller and an operation target device is not taken into consideration. The technique disclosed in Japanese Patent Application Laid-Open No. 2007-166511 is originally intended to obtain a direction between TWO adjacent directions based on a combination of two directions, and is not intended to associate different types of operation, such as pairing, with a combination of two direction keys. In addition, the idea of Japanese Patent Application Laid-Open No. 2007-166511 aims to indicate an intermediate direction between each combination of two direction keys, and it is not assumed to combine opposite direction keys.

SUMMARY OF THE INVENTION

Aspects of the present disclosure are directed to providing a technique enabling a user to easily execute pairing even when a communication apparatus, such as a remote controller, is not provided with an operation member exclusively used for pairing.

According to an aspect of the present disclosure a communication apparatus includes a communication unit configured to communicate with an image capturing apparatus, a Tele button, a Wide button, and a control unit configured to, in a case where an operation on the Tele button is received, control the communication unit to transmit information for driving a lens of the image capturing apparatus toward a telephoto side to the image capturing apparatus, and to, in a case where an operation on the Wide button is received, control the communication unit to transmit information for driving the lens of the image capturing apparatus toward a Wide side to the image capturing apparatus, wherein in a case where both the Tele button and the Wide button are simultaneously operated, the control unit controls the communication unit to transmit data for performing pairing with the image capturing apparatus in response to receipt of data transmitted from the image capturing apparatus.

Further features will become apparent from the following description of exemplary embodiments with reference to the attached drawings.

DESCRIPTION OF THE EMBODIMENTS

Exemplary embodiments will be described below with reference to the accompanying drawings. The technical scope of the present disclosure is defined by the claims and is not limited by the individual exemplary embodiments described below. Not all combinations of the features described in the exemplary embodiments are necessarily essential.

<Configuration of Remote Controller 100>

Figure 1B:
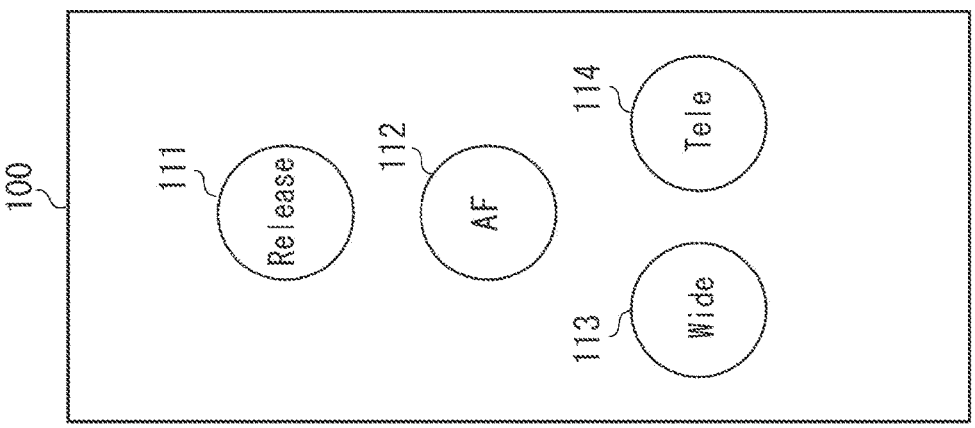
FIG. 1B illustrates operation members of the remote controller.
Figure 1A:
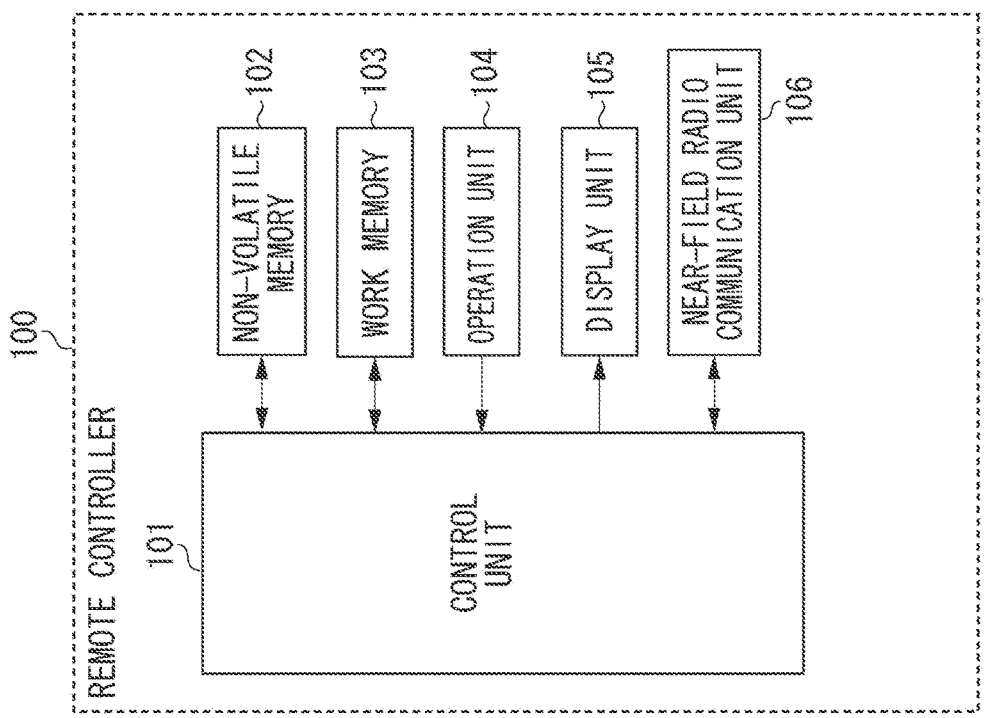
FIG. 1A is a block diagram illustrating a configuration of a remote controller.

FIG. 1A is a block diagram illustrating a configuration of a remote controller 100 which is an example of a communication apparatus. A control unit 101 controls each unit of the remote controller 100 according to input signals and programs described below. Instead of controlling the entire remote controller 100 by the control unit 101, the entire remote controller 100 can be controlled by a plurality of pieces of hardware sharing processing.

A non-volatile memory 102 is an electrically erasable and recordable non-volatile memory and stores programs and the like executed by the control unit 101. A work memory 103 is used as a work area or the like for the control unit 101.

An operation unit 104 is used to accept an instruction from a user for the remote controller 100. The operation unit 104 includes operation members, e.g., buttons, each of which corresponds to a different external communication apparatus as an operation target. An operating state of each operation member is detected by the control unit 101. In the following description, assume that the operation target is a digital camera 200 (described below with reference to FIG. 2). However, the operation target of the present exemplary embodiment is not limited to the digital camera 200. For example, the operation target can be an information processing apparatus, such as a portable media player, a tablet device, or a personal computer.

As illustrated in FIG. 13, the operation unit 104 includes, for example, a release button 111, an AF button 112, a Wide button 113, and a Telephoto (hereinafter referred to as "Tele") button 114. The release button 111 is a button that causes the digital camera 200 to perform an image capturing operation. The AF button 112 is a button that causes the digital camera 200 to perform an AF operation. The Wide button 113 and the Tele button 114 are buttons that cause the digital camera 200 to perform an operation for driving a zoom lens. When the user presses the release button 111, the remote controller 100 transmits an image capturing request to the digital camera 200. When the user presses the AF button 112, the remote controller 100 transmits an AF request to the digital camera 200. When the user presses the Wide button 113, the remote controller 100 transmits, to the digital camera 200, a Wide request for driving the zoom lens toward a Wide side. When the user presses the Tele button 114, the remote controller 100 transmits, to the digital camera 200, a Tele request for driving the zoom lens toward a Tele side.

A display unit 105 is a display device, such as an LED. When the remote controller 100 transmits an operation request to the digital camera 200 based on a user operation on the operation unit 104 and the remote controller 100 receives an operation complete notification from the digital camera 200, the display unit 105 performs display to indicate completion of the operation. For example, when the user presses the AF button 112, the remote controller 100 transmits the AF request to the digital camera 200, and the digital camera 200 performs the AF operation. When the remote controller 100 receives an operation complete notification indicating completion of in-focus from the digital camera 200, the LED of the display unit 105 blinks.

A near-field radio communication unit 106 is, for example, a Bluetooth radio unit that executes Bluetooth communication. The remote controller 100 performs Bluetooth communication with the digital camera 200, which is an operation target, through the near-field radio communication unit 106, to operate the digital camera 200. The communication standards supported by the near-field radio communication unit 106 are not limited to Bluetooth standards, but instead any communication standards can be used, as long as the communication standards involve a mechanism similar to pairing in the Bluetooth standards.

Pairing in the Bluetooth standards described in the present exemplary embodiment is processing for registering information in each piece of equipment by exchanging the information between pieces of the equipment to specify each other. The pieces of equipment in which the information is already registered are also referred to as paired pieces of equipment. The paired pieces of equipment can be thereafter connected with each other without requiring any user operation related to security, such as a password or PIN code.

<Configuration of Digital Camera 200>

Figure 2:
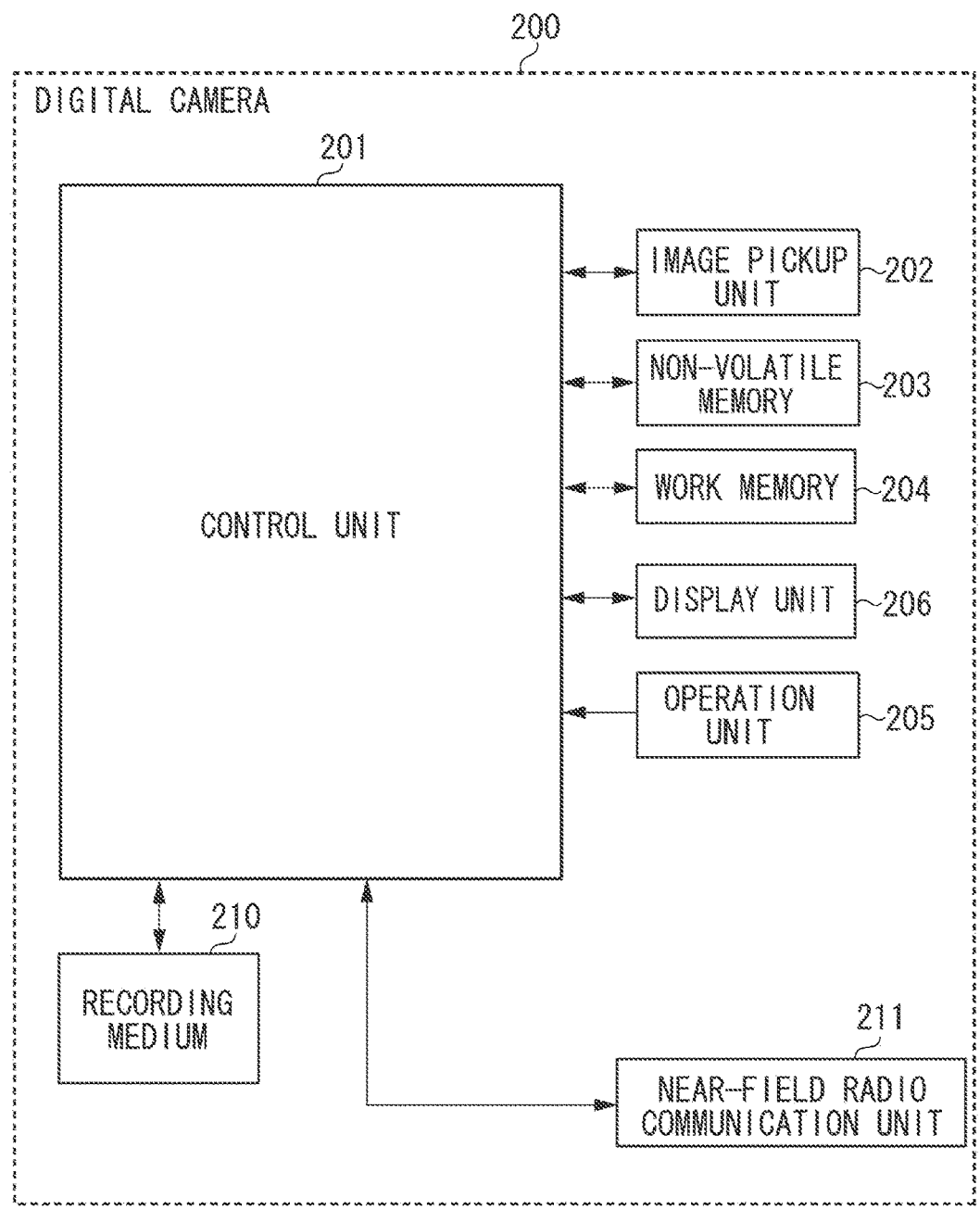
FIG. 2 is a block diagram illustrating a configuration of a digital camera.

FIG. 2 is a block diagram illustrating the configuration of the digital camera 200, which is an example of an image pickup apparatus. A control unit 201 controls each unit of the digital camera 200 according to input signals and programs described below. Instead of controlling the entire digital camera 200 by the control unit 201, the entire digital camera 200 can be controlled by a plurality of pieces of hardware sharing processing.

An image pickup unit 202 includes an optical lens unit that controls an aperture, zoom, focus, and the like, and an image sensor for converting incident light (video image) from the optical lens unit into an electrical video signal. As the image sensor, a complementary metal oxide semiconductor (CMOS) sensor and a charge coupled device (CCD) sensor are generally used. The image pickup unit 202 converts object light focused by the optical lens unit, which is included in the image pickup unit 202, into an electrical signal by the image sensor on based on the control by the control unit 201, performs noise reduction processing and the like, and outputs digital data as image data. In the digital camera 200 according to the present exemplary embodiment, the image data is recorded on a recording medium 210 in accordance with Design rule for Camera File system (DCF) standards.

A non-volatile memory 203 is an electrically erasable, and recordable non-volatile memory and stores programs and the like executed by the control unit 201. A work memory 204 is used as a buffer memory for temporarily holding the image data captured by the image pickup unit 202, an image display memory for a display unit 206, a work area for the control unit 201, or the like.

An operation unit 205 is used to receive an instruction for the digital camera 200 from the user. The operation unit 205 includes, for example, a power button for the user to instruct ON/OFF of a power supply of the digital camera 200, a release switch for receiving an image capturing instruction, a moving image capturing switch for receiving a moving image capturing instruction, and a playback button for receiving a playback instruction of image data. A touch panel formed on the display unit 206, which is described below, is also included in the operation unit 205. The release switch includes SW1 and SW2. When the release switch is in a half-pressed state, the SW1 is turned on. Accordingly, the control unit 201 receives an instruction for preparation for image capturing, such as autofocus (AF) processing, automatic exposure (AE) processing, automatic white balance (AWB) processing, or flash preliminary emission (EF) processing. When the release switch is in a full-press state, the SW2 is turned on. Accordingly, the control unit 201 accepts an instruction for performing image capturing.

The display unit 206 displays a view finder image during image capturing, displays captured image data, displays characters for interactive operation, and the like. The display unit 206 is not necessarily incorporated in the digital camera 200. The digital camera 200 is connectable to the display unit 206, which is an internal or external display unit, and can include at least a display control function for controlling the display of the display unit 206.

The recording medium 210 can record the image data output from the image pickup unit 202. The recording medium 210 can be detachably mounted in the digital camera 200, or can be incorporated in the digital camera 200. The digital camera 200 includes a function for accessing the recording medium 210 regardless of where the recording medium 210 is located.

A near-field radio communication unit 211 is, for example, a Bluetooth wireless communication unit that executes Bluetooth communication. The digital camera 200 performs Bluetooth communication with the remote controller 100 through the near-field radio communication unit 211.

<Configuration of Network System>

Figure 3:
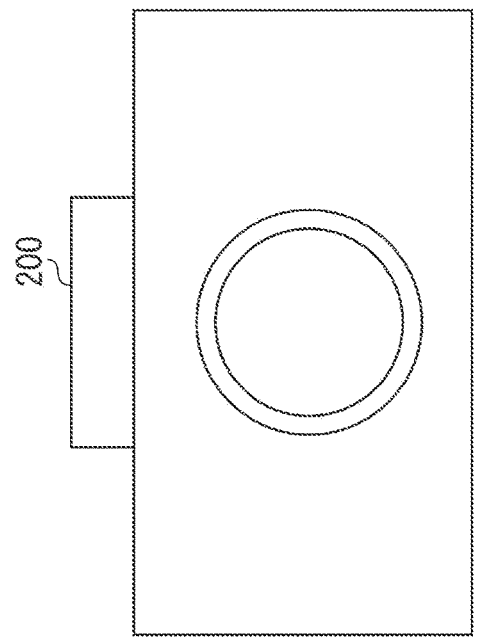
FIG. 3 is a schematic diagram illustrating a network system.
Figure 3:
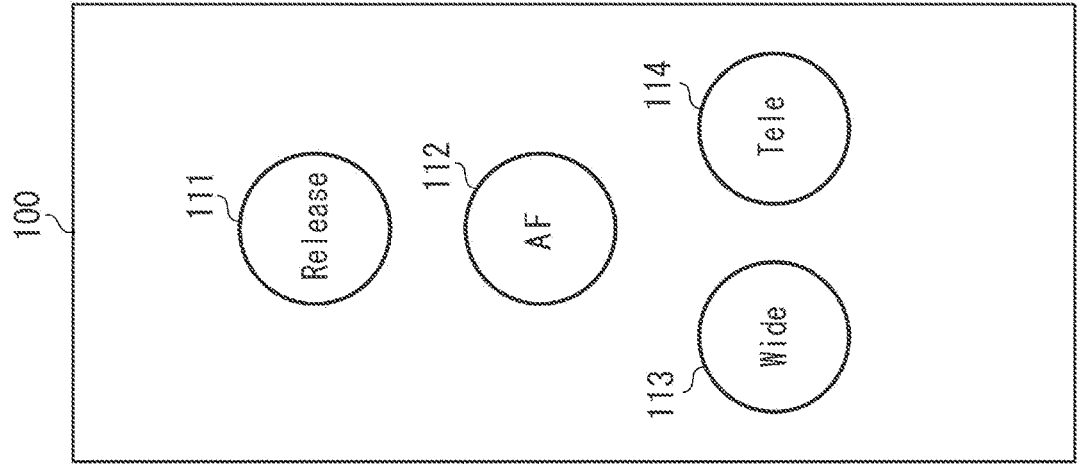

FIG. 3 is schematic diagram illustrating a network system. As described above, assume in the present exemplary embodiment that the remote controller 100 and the digital camera 200 perform Bluetooth communication with each other. As illustrated in FIG. 3, the network system is composed of the remote controller 100 and the digital camera 200, which can perform near-field radio communication by Bluetooth communication.

<Advertise Transmission Flow of Digital Camera 200>

Figure 4:
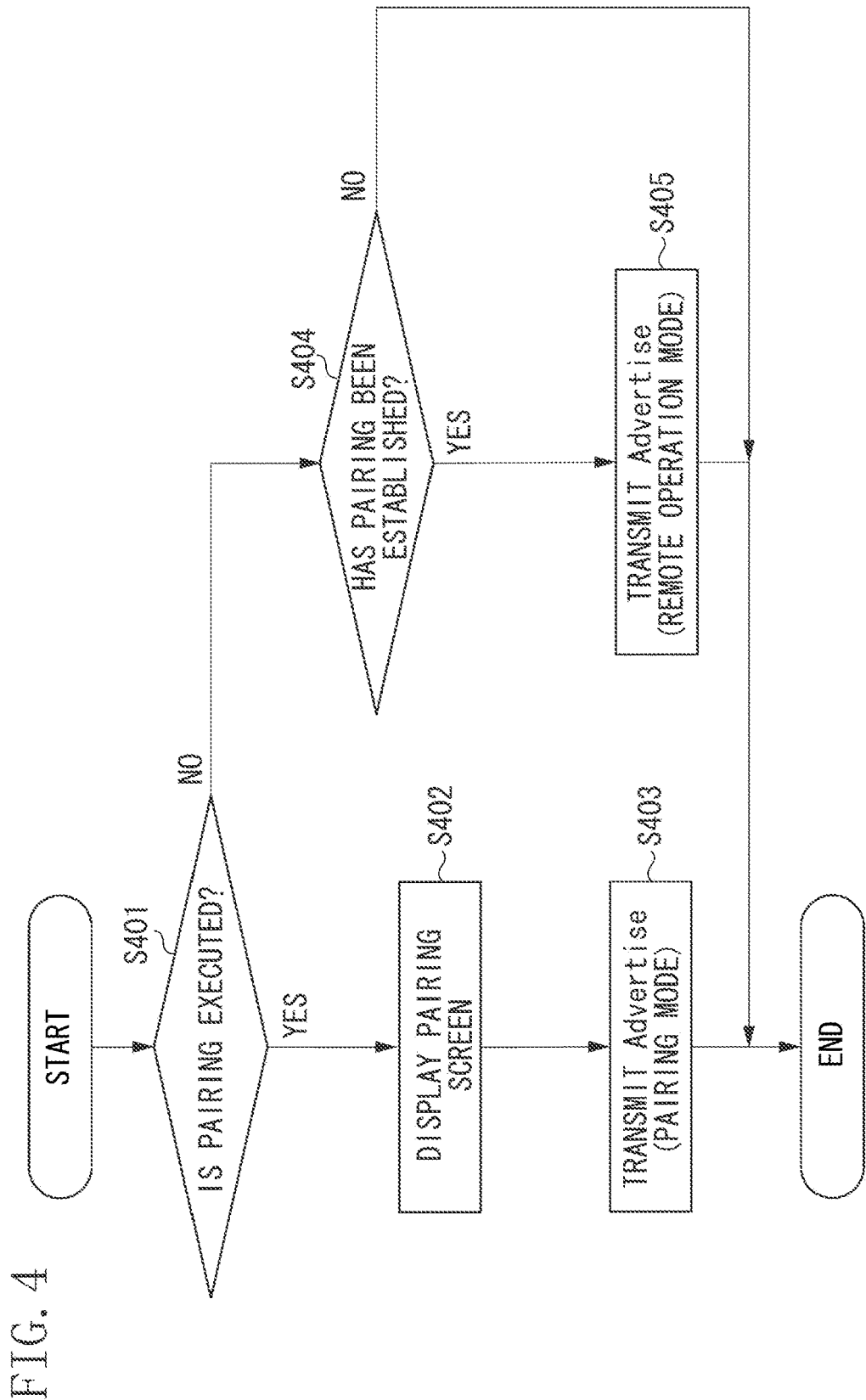
FIG. 4 is a flowchart illustrating mode switch processing executed by the digital camera.

FIG. 4 is a flowchart illustrating mode switch processing executed by the digital camera 200. Processing of each step of the flowchart is implemented such that, unless specified, the control unit 201 executes programs stored in the non-volatile memory 203. When the user operates the operation unit 205 of the digital camera 200 to provide an instruction for whether the digital camera 200 executes pairing with the remote controller 100, the processing of the flowchart is started.

In step S401, the control unit 201 determines whether execution of pairing is instructed. In a case where the control unit 201 determines that execution of pairing is instructed (YES in step S401), the processing proceeds to step S402. In a case where the control unit 201 determines that execution of pairing is not instructed (NO in step S401), the processing proceeds to step S404.

Figure 5:
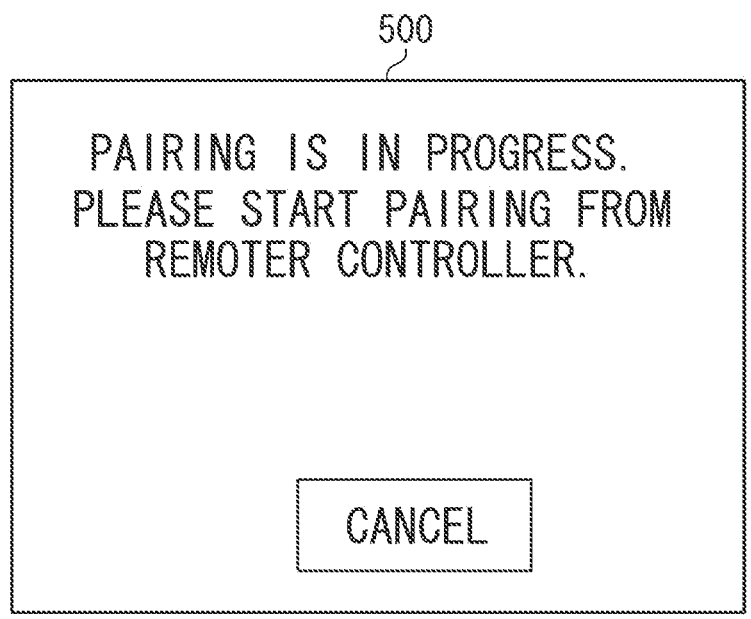
FIG. 5 is a diagram illustrating a pairing screen.

In step S402, the control unit 201 displays a pairing screen 500 (see FIG. 5) on the display unit 206 This enables the user to recognize that the digital camera 200 is in a pairing mode in which it is necessary to operate the remote controller 100 for pairing. The digital camera 200 enables execution of pairing when the pairing mode is set as an operation mode.

In step S403, the control unit 201 starts an operation in the pairing mode, and transmits (broadcasts) an advertise packet. The advertise packet (broadcast information) includes data indicating that the digital camera 200 is in the pairing mode. Accordingly, when the remote controller 100 receives the advertise packet from the digital camera 200, the remote controller 100 can recognize that the digital camera 200 is in the pairing mode. The control unit 201 receives a pairing request from the remote controller 100 during the pairing mode and performs pairing.

In step S404, the control unit 201 determines whether pairing with the remote controller 100 has been established. In a case where the control unit 201 determines that pairing with the remote controller 100 has been established (YES in step S404), the processing proceeds to step S405. In a case where the control unit 201 determines that pairing with the remote controller 100 has not been established (NO in step S404), the processing of the flowchart is terminated.

In step S405, the control unit 201 starts an operation in a remote operation mode and transmits an advertise packet. The advertise packet includes data indicating that the digital camera 200 is in the remote operation mode. Accordingly, when the remote controller 100 receives the advertise packet from the digital camera 200, the remote controller 100 can recognize that the digital camera 200 is in the remote operation mode. The control unit 201 receives a release request, an AF request, a Tele request, or a Wide request, which are described above, from the remote controller 100 during the remote operation mode, and performs an operation based on the received request. In other words, when the remote operation mode is set as the operation mode, the digital camera 200 can execute the operation based on the request (control information) received from the remote controller 100.

<Processing Flow of Remote Controller 100>

Figure 6A:
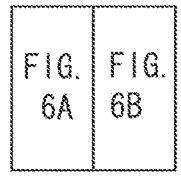
FIG. 6 (6A and 6B) is a flowchart illustrating processing executed when an operation unit of the remote controller is operated.
Figure 6:
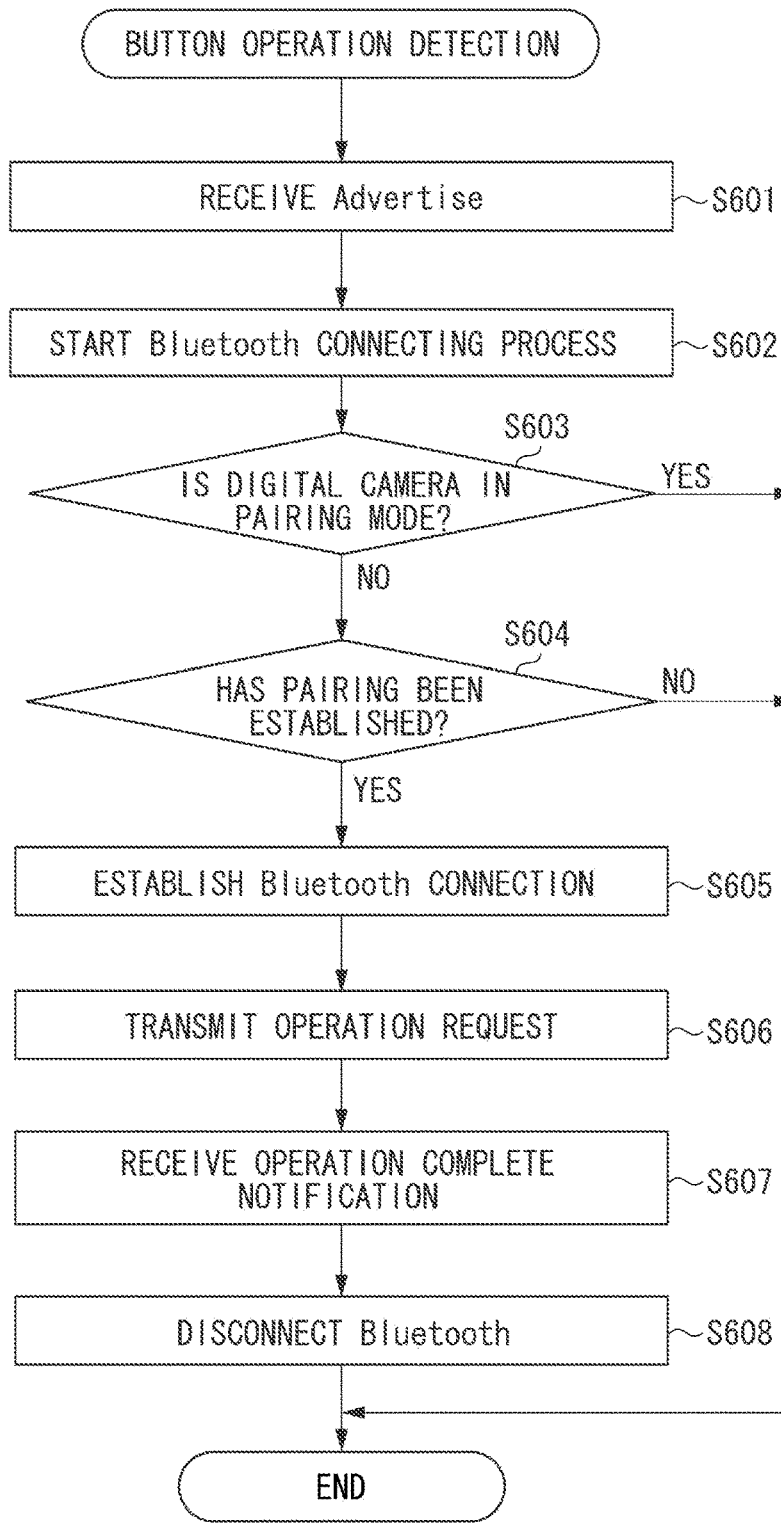
Figure 6B:
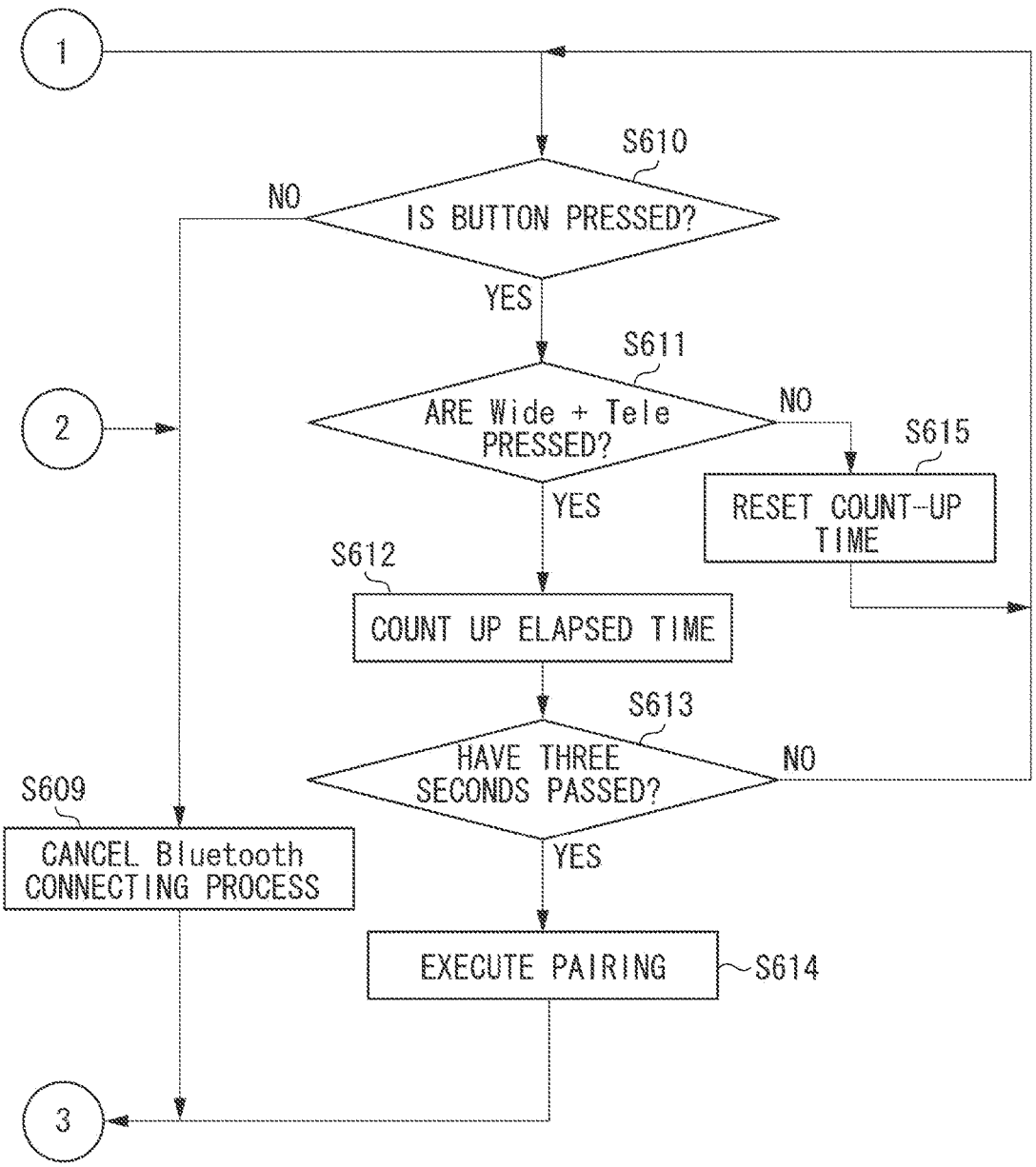

FIG. 6 (6A and 6B) is a flowchart illustrating processing executed when the operation unit 104 of the remote controller 100 is operated. Processing of each step of the flowchart is implemented such that, unless specified, the control unit 101 executes programs stored in the non-volatile memory 102. Assume herein that a Bluetooth connection is not established between the remote controller 100 and the digital camera 200 in a normal state, and when the user operates the operation unit 104 of the remote controller 100, the Bluetooth connection is established between the remote controller 100 and the digital camera 200. When the control unit 101 detects that any one of the buttons included in the operation unit 104 is operated, the processing of the flowchart is started.

In step S601, the control unit 101 receives the advertise packet from the digital camera 200 through the near-field radio communication unit 106. In step S602, the control unit 101 starts a Bluetooth connecting process with the digital camera 200.

There can be a case in which a plurality of digital cameras transmitting advertise packets exists within a communication available range of the near-field radio communication unit 106. Thus, the control unit 101 maintains a stand-by state for reception of another advertise packet, in parallel with processing of step S602 and subsequent steps, after receiving a first advertise packet from a first digital camera 200. When the control unit 101 finds a second advertise packet transmitted from a second digital camera 200, the control unit 101 receives the second advertise packet and executes the processing of step S602 and subsequent steps for the second advertise packet. Accordingly, when the control unit 101 receives a plurality of advertise packets, the control unit 101 executes the processing of step S602 and subsequent steps for each of the plurality of advertise packets.

In step S603, the control unit 101 checks the content of each advertise packet received in step S601, and determines whether the digital camera 200 is in the pairing mode. In a case where the control unit 101 determines that the digital camera 200 is not in the pairing mode (NO in step S603), the processing proceeds to step S604. In a case where the control unit 101 determines that the digital camera 200 is in the pairing mode (YES in step S603), the processing proceeds to step S610.

In step S604, the control unit 101 determines whether pairing with the digital camera 200 has been established. In a case where the control unit 101 determines that the pairing has been established (YES in step S604), the processing proceeds to step S605. In a case where the control unit 101 determines that the pairing has been established (NO in step S604), the processing proceeds to step S609.

In step S605, the control unit 101 establishes a Bluetooth connection with the digital camera 200. The control unit 101 cancels the stand-by state for reception of the advertise packets for other digital cameras. If the control unit 101 executes the processing for the advertise packets received from other digital cameras in parallel, the control unit 101 cancels this processing.

In step S606, the control unit 101 transmits an operation request corresponding to a pressed button to the digital camera 200. In step S607, the control unit 101 receives an operation complete notification from the digital camera 200. In step S608, the control unit 101 disconnects the Bluetooth connection. For example, when the user presses the AF button 112, the control unit 101 transmits the AF request by Bluetooth communication and the digital camera 200 performs the AF operation. When the AF operation is completed, the digital camera 200 transmits an operation complete notification indicating completion of in-focus via Bluetooth communication. Upon receiving the operation complete notification, the control unit 101 disconnects the Bluetooth connection.

After the Bluetooth connection is disconnected, the digital camera 200 operates in the remote operation mode and continuously transmits advertise packets. Accordingly, when the user presses any one of the buttons of the remote controller 100 again, the remote operation is carried out again in accordance with the flowchart of FIG. 6. In step S609, the control unit 101 cancels the Bluetooth connecting process.

In step S610, the control unit 101 determines whether any one of the buttons of the operation unit 104 is pressed. In a case where the control unit 101 determines that any one of the button pressed (YES in step S610), the processing proceeds to step S611. In a case where the control unit 101 determines that any one of the buttons is not pressed (NO in step S610), the processing proceeds to step S609.

In step S611, the control unit 101 determines whether both the Wide button 113 and the Tele button 114 are pressed. In a case where the control unit 101 determines that both the Wide button 113 and the Tele button 114 are pressed (YES in step S611), the processing proceeds to step S612. In a case where the control unit 101 determines that both of the Wide button 113 and the Tele button 114 are not pressed or neither the Wide button 113 nor the Tele button 114 is pressed (NO in step S611), the processing proceeds to step S615.

In step S612, the control unit 101 counts up the elapsed time. The count-up time corresponds to the elapsed time from the time when both the Wide button 113 and the Tele button 114 are pressed.

In step S613, the control unit 101 determines whether a predetermined time (hereinafter, three seconds) has passed from the time when both the Wide button 113 and the Tele button 114 are pressed. In a case where the control unit 101 determines that three seconds have passed (YES in step S613), the processing proceeds to step S614. In a case where the control unit 101 determines that three seconds have not passed (NO in step S613), the processing proceeds to step S610.

In step S614, the control unit 101 executes pairing with the digital camera 200. Accordingly, when both the Wide button 113 and the Tele button 114 are continuously pressed for three seconds, the pairing is executed. The control unit 101 cancels the stand-by state for receiving the advertise packets for other digital cameras. If the control unit 101 executes the processing for the advertise packets received from other digital cameras in parallel, this processing is cancelled. Thus, the control unit 101 is configured to execute pairing with the digital camera 200 when the control unit 101 detects that two buttons associated with opposite operations, respectively, are being operated, and when this state is continued for a predetermined time. The Wide button 113 and the Tele button 114 respectively correspond to opposite operations, i.e., an operation for driving the zoom lens of the digital camera 200 toward the Wide side and an operation for driving the zoom lens of the digital camera 200 toward the Tele side.

Accordingly, it is less likely that the user will unintentionally press the buttons simultaneously, and thus an erroneous operation is less likely to occur. If the user knows the operations associated with the respective buttons, the user can easily recognize a combination of the buttons associated with the opposite operations. Consequently, pairing can be easily executed even when there is no button exclusively used for pairing. In step S615, the control unit 101 resets the count-up time in step S612.

Figure 7:
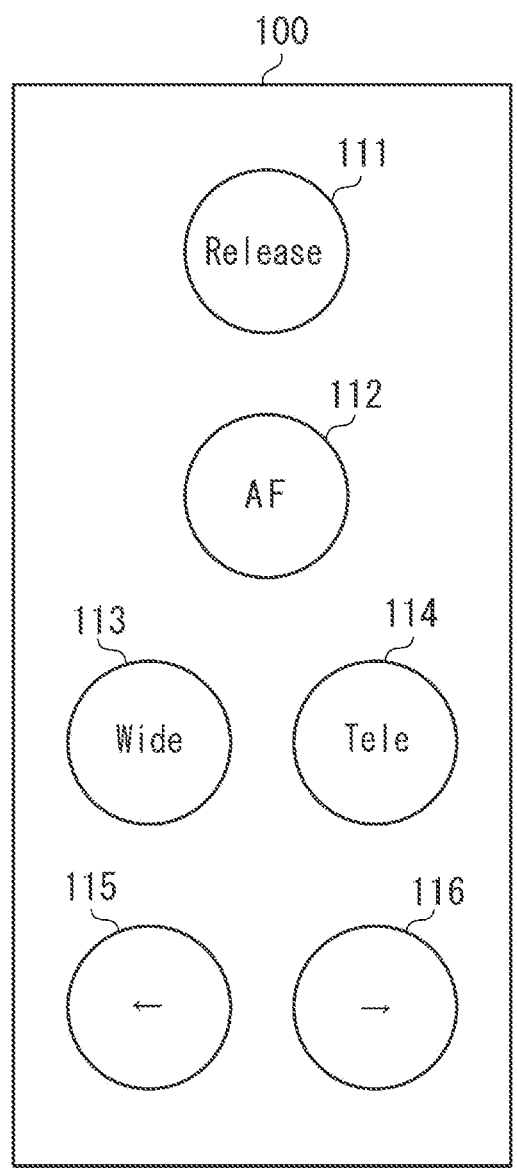
FIG. 7 is a diagram illustrating other examples of the operation members of the remote controller.

The present exemplary embodiment is not limited to the combination of the buttons for determination in step S611 being the Wide button 113 and the Tele button 114. In a more generalized form, in step S611, the control unit 101 determines whether two buttons associated with opposite operations, respectively, are pressed. A specific example thereof will be described with reference to FIG. 7. FIG. 7 is a diagram illustrating other examples of the operation members of the remote controller 100. In FIG. 7, components that are identical or similar to those in FIG. 13 are denoted by the same reference numerals.

The operation members illustrated in FIG. 7 include an image back button 115 and an image forward button 116. The digital camera 200 is configured to be able to display images on the display unit 206. A state where a plurality of images associated in a predetermined order, e.g., in an image capturing order, are recorded on the recording medium 210 and the images are displayed on the display unit 206.

In a case where the digital camera 200 is in the remote operation mode, when the user presses the image forward button 116 the control unit 101 transmits an image forwarding request to the digital camera 200, and the digital camera 200 displays the subsequent image. When the user presses the image back button 115, the control unit 101 transmits an image back request to the digital camera 200, and the digital camera 200 displays the previous image.

In a case where the digital camera 200 is in the pairing mode, when the user presses both the image back button 115 and the image forward button 116, the control unit 101 executes pairing with the digital camera 200. In this case, in step S611 of FIG. 6, the control unit 101 determines whether both the image back button 115 and the image forward button 116 are pressed. The image back button 115 and the image forward button 116 are associated with opposite operations, i.e., an operation for displaying an image preceding the image displayed on the digital camera 200 and an operation for displaying the subsequent image. Accordingly, it is less likely that the user will unintentionally press the buttons simultaneously, and thus an erroneous operation is less likely to occur. If the user knows the operations associated with the respective buttons, the user can easily recognize a combination of the buttons associated with the opposite operations. Consequently, pairing can be easily executed even when there is no button exclusively used for pairing.

The number of the operation members of the remote controller 100 can be three or more as illustrated in FIGS. 1B and 7. Alternatively, only two operation members, such as the Wide button 113 and the Tele button 114, can be provided.

According to the above-described exemplary embodiment, the remote controller 100 executes pairing with the digital camera 200 when the two buttons associated with opposite operations, respectively, are pressed. Consequently, pairing can be executed even when the remote controller 100 is not provided with a button exclusively used for pairing. Since it is less likely that the user will unintentionally press the two buttons associated with the opposite operations, respectively, the possibility for the user to unintentionally execute pairing is reduced. The user can easily recognize which button is pressed to enable execution of pairing.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-226269, filed Nov. 21, 2016, which is hereby incorporated by reference herein in its entirety.

What is claimed is:

1. A communication apparatus comprising:
   a communication unit configured to communicate with an image capturing apparatus in a communication mode that requires pairing between the communication apparatus and the image capture apparatus;
   a Tele button;
   a Wide button; and
   a control unit configured to, in a case where an operation on the Tele button is received, control the communication unit to transmit information for driving a lens of the image capturing apparatus toward a telephoto side to the image capturing apparatus, and to, in a case where an operation on the Wide button is received, control the communication unit to transmit information for driving the lens of the image capturing apparatus toward a Wide side to the image capturing apparatus,
   wherein in a case where both the Tele button and the Wide button are simultaneously operated, the control unit controls the communication unit to transmit data for performing pairing with the image capturing apparatus in response to receipt of data transmitted from the image capturing apparatus indicating the image capture apparatus is in a pairing mode, and
   wherein the control unit controls the communication unit to transmit an operation request in a case where the image capturing apparatus is not in the pairing mode and pairing has been established between the communication apparatus and the image capturing apparatus.

2. The communication apparatus according to claim 1, wherein when an operation mode of the image capturing apparatus is the pairing mode that executes the pairing, the control unit controls the communication unit to transmit the data for performing the pairing.

3. The communication apparatus according to claim 1, wherein the communication unit receives data from the image capturing apparatus indicating the image capturing apparatus is in a remote operation mode,
   wherein, if the data indicating the image capturing apparatus is in the remote operation mode is received and an operation on the Tele button is received, the control unit controls the communication unit to transmit the information for driving the lens of the image capturing apparatus toward the telephoto side to the image capturing apparatus, and
   wherein if the data indicating the image capturing apparatus is in the remote operation mode is received and an operation on the Wide button is received, the control unit controls the communication unit to transmit the information for driving the lens of the image capturing apparatus toward the Wide side to the image capturing apparatus.

4. The communication apparatus according to claim 1, wherein the control unit determines an operation mode of the image capturing apparatus based on content of an advertise signal provided by the image capturing apparatus.

5. The communication apparatus according to claim 1, wherein the communication unit is configured to conform to Bluetooth standards.

6. The communication apparatus according to claim 1, further comprising a release button and an autofocus button.

7. The communication apparatus according to claim 1, wherein until a lapse of a predetermined time from a time when both the Tele button and the Wide button are operated, the control unit controls the communication unit not to transmit data for performing pairing with the image capturing apparatus.

8. A control method for a communication apparatus that includes a communication unit that communicates with an image capturing apparatus in a communication mode that requires pairing between the communication apparatus and the image capture apparatus, a Tele button, and a Wide button, the control method comprising:
   controlling, in a case where an operation on the Tele button is received, the communication unit to transmit information for driving a lens of the image capturing apparatus toward a telephoto side to the image capturing apparatus;
   controlling, in a case where an operation on the Wide button is received, the communication unit to transmit information for driving the lens of the image capturing apparatus toward a Wide side to the image capturing apparatus;
   controlling, in a case where both the Tele button and the Wide button are simultaneously operated, the communication unit to transmit data for performing pairing with the image capturing apparatus in response to receipt of data transmitted from the image capturing apparatus indicating the image capture apparatus is in a pairing mode; and
   controlling the communication unit to transmit an operation request in a case where the image capturing apparatus is not in the pairing mode and pairing has been established between the communication apparatus and the image capturing apparatus.

9. A non-transitory computer-readable medium storing a program for causing a communication apparatus that includes a communication unit that communicates with an image capturing apparatus in a communication mode that requires pairing between the communication apparatus and the image capture apparatus, a Tele button, and a Wide button to controlling, in a case where an operation on the Tele button is received, the communication unit to transmit information for driving a lens of the image capturing apparatus toward a telephoto side to the image capturing apparatus;

controlling, in a case where an operation on the Wide button is received, the communication unit to transmit information for driving the lens of the image capturing apparatus toward a Wide side to the image capturing apparatus;

controlling, in a case where both the Tele button and the Wide button are simultaneously operated, the communication unit to transmit data for performing pairing with the image capturing apparatus in response to receipt of data transmitted from the image capturing apparatus indicating the image capture apparatus is in a pairing mode; and controlling the communication unit to transmit an operation request in a case where the image capturing apparatus is not in the pairing mode and pairing has been established between the communication apparatus and the image capturing apparatus.

* * * * *